(12) United States Patent
Reist

(10) Patent No.: US 6,304,795 B1
(45) Date of Patent: Oct. 16, 2001

(54) OPERATION FOR PROCESSING PIECE GOODS AS WELL AS CONTROL PROCESS AND FACILITY FOR CARRYING OUT THE PROCESSING OPERATION

(75) Inventor: Walter Reist, Hinwil (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 09/230,071
(22) PCT Filed: Jul. 16, 1997
(86) PCT No.: PCT/CH97/00276
§ 371 Date: Jan. 19, 1999
§ 102(e) Date: Jan. 19, 1999
(87) PCT Pub. No.: WO98/03347
PCT Pub. Date: Jan. 29, 1998

(30) Foreign Application Priority Data

Jul. 19, 1996 (CH) .................................................. 1822/96

(51) Int. Cl.$^7$ ....................................................... G06F 7/00
(52) U.S. Cl. ..................... 700/219; 700/223; 700/228; 700/230; 270/4; 270/1.3; 53/399
(58) Field of Search .................................... 700/219, 200, 700/221, 222, 223, 224; 270/4, 1.03; 53/399

(56) References Cited

U.S. PATENT DOCUMENTS

| | | |
|---|---|---|
| 4,531,061 | 7/1985 | Rabinow . |
| 4,817,778 | 4/1989 | Davidson . |
| 4,854,439 | 8/1989 | Ueda . |
| 5,025,610 | 6/1991 | Graushar . |
| 5,062,524 | 11/1991 | Nozaki . |
| 5,280,895 | 1/1994 | Meier . |
| 5,388,703 | 2/1995 | Schoenenberger . |
| 5,414,974 | * 5/1995 | Van De Ven et al. .................. 53/399 |
| 5,732,939 | 3/1998 | Meier . |

FOREIGN PATENT DOCUMENTS

| | | |
|---|---|---|
| 0 680 916 A | 11/1995 | (EP) . |
| 0 716 037 A | 6/1996 | (EP) . |

OTHER PUBLICATIONS

Ho, Johm K.L. and Ranky, Paul G. , An object–oriented and flexible material handling system, Assembly Automation, vol. 15 No. 3 pp. 15–20, 1995.*

Wu, M.C. and Lui, C.R., Flexible process planning for finish machining based on process requirements modeling, Computer Intergratedf Manufactureing, vol. 4 Nol. 2, pp. 121–132, 1991.*

"Bindery Book Tracking System," No. 348, Emsworth, GB, Apr. 1993, p. 241.

* cited by examiner

Primary Examiner—Christopher P. Ellis
Assistant Examiner—Michael E. Butler
(74) Attorney, Agent, or Firm—Oppedahl & Larson LLP

(57) ABSTRACT

The claimed processing operation is used to process piece goods. Large numbers of at least similar objects are processed by feeding objects into the operation in streams (PS) of starting products (A), feeding the starting products and/or intermediate products in product streams (PS) to processing steps (7, 8, 12, 14, 15 . . . ) where they are processed and then carried away from the processing steps, and discharging the processed objects from the operation in streams of end products (EP). In the incoming and outgoing product streams individual products or product groups are conveyed in a sequence. At each processing step at least one property of a processed product or product group is changed. The claimed operation is characterized by sequence changes (4, 5, 6, 10, 13, 16, 17 . . . ) in which the sequence of products or product groups can be changed by transferring products in or out or combinations of both. As a result, the processing steps can be linked to any degree of complexity and nevertheless the operation can be carried out with great flexibility. Sequence changes as well as at least some of the processing steps can then be controlled according to relevant properties of the incoming products or product groups and/or according to a predetermined sequence to be established.

31 Claims, 10 Drawing Sheets

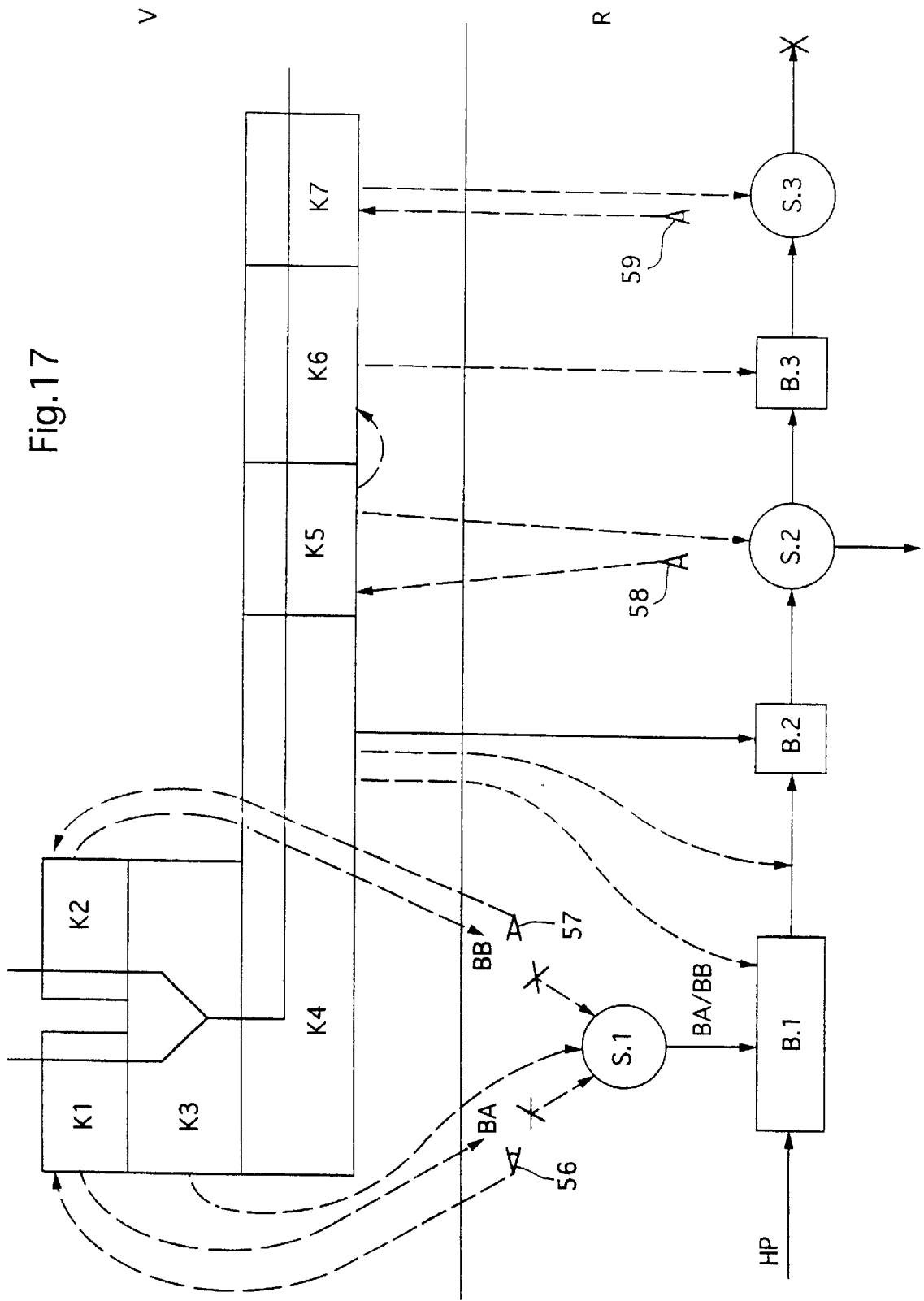

OPERATION FOR PROCESSING PIECE GOODS AS WELL AS CONTROL PROCESS AND FACILITY FOR CARRYING OUT THE PROCESSING OPERATION

BACKGROUND OF THE INVENTION

The invention is in the field of piece-good processing and concerns a method according to the generic part of the first independent claim as well as a controlling method and an installation according to the generic parts of the corresponding independent claims and serving for controlling and for carrying out the inventive method. With the aid of the inventive method, piece-goods are processed whereby the term 'piece-goods' herein is to be understood as items in large numbers being processed mainly individually, being handled in an organized configuration (as opposed to bulk goods) and having same or at least partly similar characteristics (e.g. different printed products and parts of printed products) such that items to be handled and processed in succession can be handled and processed with substantially the same means and in substantially the same manner.

The term 'method for processing piece-goods' herein is to be understood as a method:

to which items (starting products) are supplied in the form of at least one product stream (e.g. printed products or product parts from a rotary printing machine or from stock), in which in at least one processing step starting products and/or intermediate products are processed, whereby the processing step (e.g. trimming, stitching, binding, addressing, folding) changes at least one characteristic of a processed item and/or whereby in the processing step products are joined (by e.g. gathering, inserting, collating, or stacking product parts) to form new items with new characteristics and from which items are conveyed away as end products again in at least one product stream.

The items to be supplied to the processing method are supplied in the form of a product stream (e.g. printed products supplied by a rotary printing machine) or they are taken from stocks where they are stored in discrete storage formations (e.g. reels, stacks) which storage formations are transformed into product streams for being supplied to the processing method. In an additional process step, the end products conveyed away from the processing method in form of product streams, can be collected in groups, e.g. in shipping units (e.g. packages). It is also possible to transform product streams of product parts coming out of processing steps into discrete storage formations (e.g. rolls, stacks) and, after an intermediate storage, to change the discrete storage formations into product streams again.

For different processing steps, substantially stationary automated processing stations are provided. Products are supplied to these stations in product streams and are conveyed away from them in product streams, whereby during processing, the items are continuously conveyed or are stationary. The product streams substantially consist of individual items (products) being conveyed in succession and being processed individually or in groups, whereby the items of one group are processed substantially in parallel.

Processing methods of the kind as described above are not only known from methods for processing products of printing machines, to which the examples given in brackets in the paragraphs above relate, but also e.g. from the assembly of printed circuit boards, from the packaging industry (e.g. cleaning, checking and filling of bottles) and from many different branches of industry in which piece-goods are processed.

Over the last decades, such processing of piece-goods has been developed to the aim of processing more items in less time. For this purpose, processing devices and conveying systems with increasing capacity have been developed. The application of transport means for conveying items individually and for processing them while being conveyed without the need for special guide means and without stopping the conveying movement has contributed considerably to this development. Such transport means are e.g. transport chains with equidistant grippers attached to them each for gripping one individual item and for holding the gripped items in a more or less defined position.

The development as described above has made it possible to drastically lower the processing costs per item, however, only under the condition that very large numbers of substantially identical items can be processed or that the items only receive a specific identity in as late a processing step as possible (e.g. by addressing).

It shows, however, that in the most various fields very high output of identical items burdens the market to such a degree that the prices must be lowered correspondingly which again has a negative effect on the economy of the processing. A way out of this negative spiral may consist in developing the processing methods such that various different end products can be produced by different processing of identical or different starting products, not only in substantially independent processes carried out after each other but in particular in predetermined sequences in which numbers of identical successive products are small in relation to the total output and show no regularity (e.g. production of the most various printed products in a sequence corresponding to a post route). This kind of development cogently leads to a larger number of necessary process steps and to increased requirements regarding flexibility (capacity to deal with fast temporal changes) of method and devices.

The kind of development as described above is also desirable for including more and more process steps in a highly automated processing method which steps were originally carried out on end products of automated processing methods by personnel (e.g. collecting different numbers of different printed products in groups, addressing the groups and directing them to the retailer according to the address).

Furthermore, there is a desire for such a development on the market side because the buyer of the processed items is rather prepared to buy at an adequate price if he or she receives a product corresponding more precisely to his or her wishes but still without delay.

Due to the described needs which all point in the same direction (differing end products in relatively fast succession) a corresponding development is observed in the field of piece-good processing. In other words attempts are made to design processing such that, with as little loss of capacity as possible, it allows differing processes for differing end products. This is mainly realized by conveying all of the products on the same path through processing stations in which they are processed or are not processed according to the end product they are to become.

It now shows that this development has reached its limit. On the one hand it becomes necessary to transfer more and more intermediate products from the substantially continuous process to intermediate storage in ever smaller groups. For this purpose these groups must be transformed into storage formations and then transformed back into product streams. Thus the method management for transferring these intermediately stored groups correctly back into the continuous method becomes very complex.

On the other hand the high flexibility demand of the named development causes faults to disturb the process to such a degree that provisions must be made to prevent faults by all means. Such provisions become very expensive.

An increased complexity is to be understood as a finer subdivision, e.g. in the sense of an extreme personalization of the processing of print products. The increase in complexity normally makes additional processing steps necessary. Thereby, it depends on how these additional processing steps are organized and carried out. The term 'degree of freedom' is to be understood as the operative possibility to change the complexity in each process phase, i.e. selectively increasing or decreasing complexity at any point in time, even in the midst of a process. The subdivision of the print media into more and more different subjects (which leads to small editions and even mini-editions) being today more and more in demand and the drive toward more and more personalized products (totally opposed to any attempt to standardization in order to lower cost) together with retail prices that are rather falling than rising, urgently demands new processing methods showing higher flexibility.

Two examples for increasing the flexibility of per se known processing methods for products of printing machines are described in the publications EP-511159 (or U.S. Pat. No. 5,280,895) and DE-19524912 which both deal with the solution of the problem of creating a predetermined sequence of different products by means of controlled variation of the product part combinations.

Both methods according to the publications named above make use of known processing stations and known means for conveying product streams to the processing stations and away from them, especially conveying chains on which grippers are arranged for gripping, conveying and depositing one printed product each.

Both publications show clearly how complex the solutions of quite simple problems are and especially what extreme provisions must be made to prevent faults. Both publications thus show that for more complex problems the finding of new solutions is absolutely necessary.

It is therefore the object of the invention to create a method for processing piece-goods which method is to make it possible to go beyond the limitations of known such methods, i.e. even for a process of a high complexity (large number of process steps acting in different ways on items) the method is to have a considerably higher flexibility (ability to adapt to fast changes), without on the one hand expenditure becoming unacceptably high and without on the other hand further high expenditure for fault prevention.

Furthermore, it is the object of the invention to create a controlling method for controlling the processing method and an installation for carrying out the processing method.

These objects are achieved by the processing method, the controlling method and the installation as defined in the claims.

SUMMARY OF THE INVENTION

The basic idea of the invention is to break the rigid product sequences in the product streams as they are known from present-day methods, i.e. to make the succession or sequence of products (or product groups) in product streams which are supplied into or conveyed away from processing stations changeable by conveying them through stations for sequence transformation. In these stations, the sequence transformations are controlled according to a predetermined sequence to be established (i.e. according to conditions which are to be created or exist downstream) and/or according to at least one characteristic of the products of the stream to be changed (i.e. according to the conditions existing upstream). The processing stations also are at least partly controlled according to a predetermined product sequence to be established and/or according to at least one characteristic of the products supplied to the processing station.

Furthermore, the items being processed are no longer controlled by relating them to the time (maintaining a process organization by complete clocking control of the process) or by their position in a sequence but according to the invention processing is controlled according to actual contexts in which an individual item (printed product) or a plurality of items is found at the very moment (context orientated processing).

The actual context, i.e. the functional processing environment, in which an item is present represents part of the network character of the whole process.

This network character is to be understood as the totality of part processes, operative ones and inoperative ones, which contribute or can contribute to the progress of the process. Operative part processes e.g. include transport lines from one processing station to another one and also the processing stations themselves; inoperative part processes include e.g. buffer lines or recirculation loops in which the printed products actually move, in which however, no processing, no (active) transport into processing or between processing steps takes place. Even if the terms describing a processing course sometimes overlap (e.g. conveying to a processing station or conveying on a recirculation loop) they are functionally strictly separated, because they happen in different contexts.

The items, e.g. printed products, can either be processed as single individuals or in a collective (cluster). An important requirement, however, is that the maximal recognition or monitoring potential always registers the individual item although a cluster, i.e. the summation of more than one item, may also be handled as one object, in the same way as an individual printed product. This kind of collective is always a group of individual items, e.g. a group of individual printed products.

The installation for carrying out the inventive method comprises processing stations (at least one) which are connected to each other by means of conveying paths and sequence changing stations, the conveying paths and sequence transformation stations cross-linking the processing stations to form a network.

The term 'product stream' in the present text is to be understood as a line of products or product groups in which line the distances between the products are regular (clocked stream) or irregular (not clocked stream) and whereby the products are all conveyed together or individually along the line in one direction but can also temporarily stand still.

The term 'sequence' as used in this description is to be understood as the succession of products in a product stream. This sequence is irrelevant in a stream of identical products as the products are randomly exchangeable. However, the product sequence in a product stream plays an important role as soon as the products differ from each other in one or more characteristics and as soon as these characteristics are relevant for the further processing. The sequences to be considered are in particular but need not be irregular, i.e. have no pattern which repeats itself cyclically. A sequence may contain identical products, but this also is not a condition. The sequences may comprise larger or smaller clusters of successive, identical products, whereby this kind of cluster is relatively small compared to the number of items being processed.

Through sequence transformation the succession of products or product groups in a stream is changed. It is to be taken into account that removing a product from a clocked stream and such creating a gap in the stream does not constitute a sequence transformation but is a change in the characteristics of the specific sequence position (a product with defined characteristics is replaced by a product having 'zero-characteristics'). The same is valid for introducing a product into a gap of a clocked stream. In opposition to this the closing of a gap in a clocked stream is to be seen as a removal of one sequence position and thus as a sequence transformation which makes two products to become neighbors which were not neighbors before (separated by gap).

By using stations for sequence transformation as shortly described above a complexity and flexibility becomes possible which is not imaginable with known methods based substantially on sequence-invariant product streams or at the most clock-controlled (cyclic) sequence transformations, because with these stations the processing paths of the products can be cross-linked in almost any manner to a very high degree of complexity. However, subordination of such a process to one single system clock (most important control means in known methods) is no longer possible. Therefore, also regarding process control new solutions must be found. Regional clock regimes are still advantageous, especially for specific process steps, whereby such clock regimes can now be totally de-coupled from each other but still without the necessity of intermediate storage between them.

To begin with, when initializing the processes, a kind of inventory of items to be processed and of process steps for acting on the items is made. The items to be processed are physical units, they are e.g. newspaper parts, products to be inserted in other products or supplements of all kind which finally, processed to the end, are to be removed from the process in form of end products (they are processed on product paths). The plurality of necessary process steps and their allocations are not material, they exist as data or data sets (and are processed on data paths). The allocation of processing data to printed products happens within the corresponding context fields by processing (the products are processed on processing paths). On making inventory or on initialization, process steps and items are recorded (which results in a lot of data to start with) but during processing only transformations and processing requirements according to the contexts must be taken into consideration (which requires relatively little data and thus is fast and flexible). During processing there, are alternating synchronizations and de-synchronizations, giving-up and resuming time- and address-dependence. In the de-synchronized passive phases the items are still inside the processing but free of time (address-dependent) and are available at any time for being taken over into a time or clock regime again. However, this does not mean that nothing moves in a passive phase, merely no 'processing' takes place. In synchronized active phases the printed products are free of address but time-dependent.

An active phase is substantially a processing phase. It is, for the time being, controlled e.g. by a time-dependence and thus, for this part of the processing (active processing phase) the well established clock regime takes over temporarily. Transfer into the clock regime, however, is possible only if a printed product or a cluster is within a precisely defined context (e.g. a product part is in an active phase, an insert is in a passive phase and together with the corresponding data allocation, they form a context which e.g. is to activate a switch point such that the product part and the insert are transported to an insertion device. In the following context—i.e. the context following next—the products are both in the active phase and the allocated data set activates insertion).

The same is valid for the removal of printed products from the clock regime into the time-independent address-controlled phase (waiting loops, buffers, storage etc.). A process step is triggered by the context allocated to this process step and as long as the context is not as required, further processing (i.e. this specific processing step) does not take place. Instead, measures are immediately initialized in order to create the required context. This is never the case in known straightforward processing. Furthermore, it can already be recognized here that the cost of a process of an increasing degree of complexity is not over-proportional as before but increases linearly or even sub-proportionally.

The process context comprises all the data divided into active (=topical) and passive (=not topical) data sets and the items allocated thereto or their identification regarding time/place or address respectively. This data is assigned and allocated to predetermined contexts. A topical data set and the objects allocated to it are in some process state or process step within the overall process. The effect of processing on an object is an active function; the passive function thus is the absence of processing. An aimed dislocation (removal/supply) of items or individuals from their current cluster (e.g. active cluster), e.g. for transferring them, again in aimed manner, into a different cluster (e.g. passive cluster) is an active function also. This kind of transition from active to passive corresponds to a removal from time-dependence and transfer into address-dependence (de-synchronization of the individual printed products) and the transition from passive to active again leads back into timedependence (synchronization of the individual printed products).

In this manner any desired degree of complexity can be created and controlled. On the other hand, in the same manner, any existing degree of complexity can be brought under process control. The printed products can be registered individually or can be allocated to clusters of any size, they can be taken out of the processing, be addressed and be made passive (for further processing steps) and they can be activated again, i.e. be transferred back into the processing or also be allocated in a very aimed manner to a specific active item. All this happens under the regime of a mutual context-orientated process control which is based on a plurality of predetermined contexts (and context fields). The time- or address-dependence is a means removing items from active functions such as processing in general into passive functions such as waiting loops, buffering, storage etc. and back again into active process phases. Hereby, the individual product (a product part, an insert product) as such is being monitored all the time. Dislocations of an individual product p out of a group Gx into another group Gy are e.g. registered by indicating the change in form of new groups Gx=(Gx minus p) and Gy+=(Gy plus p), whereby this can be a permanent condition or a transitory one. Registering such a change of data and data sets is no problem using modem computer means.

Within the process, interesting contexts can occur. E.g.: a product group Gp (passive cluster) which has been transferred out of the time-dependent active phase and is presently under the address-regime is moving in a waiting loop in order to be brought together with an allocated product group Ga (active cluster) which is being processed (transport movement), i.e. is under time-regime (compare to FIG. 10). Although the products of both clusters are in motion, are maybe even moved at the same speed, they differ regarding the context they are allocated to. This, of course, is not visible.

Processing can e.g. consist in combining the group Gp to the group Ga, whereby Gp is integrated into Ga by uniting each passive product element of the group Gp with an active product element of the group Ga, e.g. joining of product parts, inserting of addressed insert products, attaching of addresses etc. (for illustration also see FIG. 14b).

For carrying out the inventive processing method, as for known methods, transport means for conveying products and guide means for guiding products during processing are required. Already for known methods it is advantageous to design the transport means as guide means also such that processing during continuous conveyance becomes possible, in particular without handing over the products from transport or guide means to other such means. Although, for avoiding handing-over steps, more elaborate combined transport/guide means (e.g. gripper chains as opposed to conveying belts) for individual guidance of each product are necessary, the methods nevertheless become more economic.

If handing-over is to be avoided in the inventive method, this means that instead of transport means with individual guide means to be allocated to single products it is advantageous to provide individual transport means which are independent of each other and are allocated to individual products or product groups. At the same time, these transport means may serve as guide means and are to be designed correspondingly. Only with such individual transport means sequence transformations without handing-over of items becomes possible. Handing-over from one transport means to another is, however, still necessary where products are changed by the processing in such a manner that they can no longer be transported by the same transport means and where processing stations with own guide or transport means respectively are to be used. Handing-over is also necessary where product streams are formed e.g. from storage formations or from shipping units.

BRIEF DESCRIPTION OF THE DRAWINGS

The inventive processing method, the controlling method for controlling the processing method and the installation for carrying out the processing method are described in more detail in connection with the following Figures, whereby:

FIGS. 11 to 14a and 14b show different, exemplified embodiments of processing steps;

FIG. 17 shows a diagram for illustrating the interaction between a context field on a virtual level and a process on a real level.

DETAILED DESCRIPTION OF THE INVENTION

Contexts are predetermined conditions within a whole process and comprise e.g. three elements: an allocation direction (action) and at least two involved allocation elements (products which are to be allocated to each other). Contexts may contain a plurality of allocation directions and a plurality of allocation elements, they may also only comprise one single element (two identical elements imaged on each other) and one allocation direction, e.g. folding of a product part as allocation direction and the product part as allocation element (context: product part and folding direction triggers the folding process). The latter is in fact trivial but shows that in a context orientated process all processing tasks are contained, not only the more complex connections.

An example (for illustration see FIG. 14a) for an elementary context with an allocation direction Z1 and two involved allocation elements E1 and E2 is the following: Z1=opening and inserting, E1=main product (a product part), E2=insert product (another product part). If the context {E1, E2, Z1} is present (if the actual context coincides with the predetermined or required context) this leads to the action (A): opening of the main product E1 and inserting of the product part E2 ({E2, E2, Z1}→A). An actual context {E2, E3, Z} does not trigger the action A because the actual context does not coincide with the predetermined context (E3 is a wrong product). The predetermined or conditional context {E2, E2, Z1}→A) is stored in the context library in a computer. On the axiomatic level this may look rather trivial but as soon as more complex contexts are used this changes quickly without, however becoming 'more complicated' regarding the process. This simple direction is valid for any context composed in any manner.

For carrying out a specific action (e.g. via actors AK), it is necessary to recognize and to register actual contexts and combinations thereof (e.g. via sensors SE). For this purpose all conditional context elements are held available in a library (the library of context elements) as well as corresponding linking directions which are held available in a further library (link library). Data in the context element library and in the link library together represent the (virtual) potential of the contexts. The control contexts are stored like macros in a further library (context library). In the context library, all conceivable process steps are collected and stored.

Figure 1:
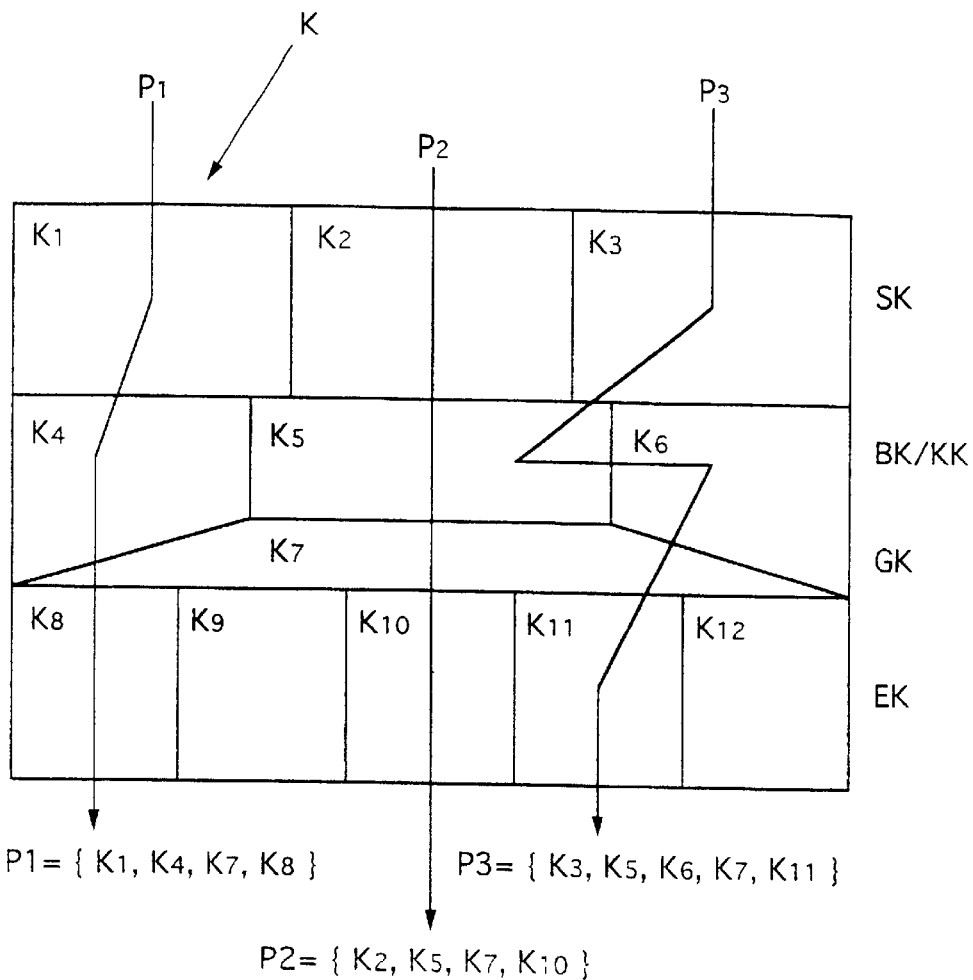
FIG. 1 shows a field of control contexts with exemplified process paths.

FIG. 1 shows a freely chosen arrangement (context field) of 12 control contexts, subdivided into starting contexts SK, processing contexts BK, general contexts GK and end contexts EK through which three part processes of a whole process progress on substantially parallel process paths P1, P2, P3. Of course, any number of part processes and branchings thereof may be envisaged. It can be seen that not all context fields are used (e.g. contexts for faults which do not occur); contexts K9 and K12 are e.g. not used. Furthermore there is the context K7 through which all process paths progress. This kind of general context may be a check context KK in addition to being a process context. Process P1 progresses through contexts K1, K4, K7 and K8 in which processing and transport steps are triggered, i.e. on this process path the actual context must be correct four times for the corresponding action to be triggered, for a new context to be created and for the process to be thus advanced to a further control context.

Process P2 runs through the same amount of different control contexts K: K2, K5, K7 and K10. Here, the starting context, processing context and end context differ. The part process proceeding on process path P2 can e.g. be temporally de-coupled from the part process proceeding on process path P1 or e.g. meet temporally in control context K7. Whether the one or the other happens depends on the contents of the control contexts in question.

The part process proceeding on process path P3 comprises one processing step more compared to the others. It runs through control contexts K3, K5, K6, K7, K11. It has control contexts KS and K7 in common with process path P2, there is however an additional control context K6 in-between which e.g. triggers an additional process step (e.g. printing of an address). This kind of additional process step, however, does not make it impossible that the process on this path advances in synchronism with the process progress on the other paths. Context K4 can e.g. trigger an introduction into a waiting loop and conditional context K7 can contain a temporal synchronization with the other part processes which causes the triggering of a re-introduction into processing.

Figure 2:
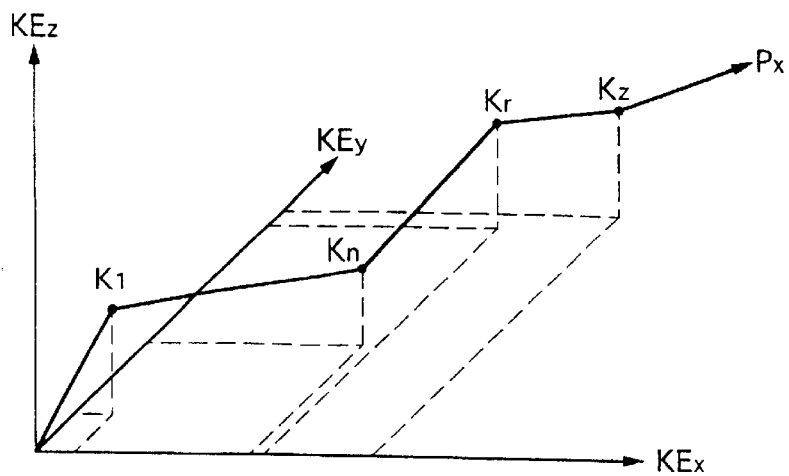
FIG. 2 shows a three-dimensional context field for more complex processes.

FIG. 2 shows a graphic representation of a three-dimensional process field having context axes KEx, KEy, and KEz and therefore, being relatively simple to be represented. The next steps to a multi-dimensional process field such as can be found in practice can no longer be represented in an understandable form by means of a figure. For a computer, however, it is no problem to image a corresponding process path or process paths including fault contexts and branchings, starting from a large amount of possible control contexts. The processes to be carried out according to a given method and in a given installation are programmed in a similar manner as a computer program and they control the process progress via release, change of mode or blocking of process steps (processing steps, transport steps, sequence transformation steps). The virtual model of the process so to speak progresses superimposed on the real processing, it generates control signals for the real process and receives sensor signals from the real process.

When using the context-orientated controlling method actual contexts are to be registered for comparison with conditional contexts and for verifying their coincidence. Registration of actual contexts is on the one hand possible via sensors SE (registration on the real level), whereby faults on the real level are registered at the same time or on the other hand retrospectively via updated data (registration on the virtual level) e.g. by reading of counters (for sequence controlled actions) or by registration of the previous relevant changes (for characteristic-controlled processes), wherein faults on the real level are not included. The amount of sensors to be installed for registering characteristics of items is advantageously adapted to the probability and relevance of expected faults such that an optimum between cost and risk is achieved.

If an actual context is the same as the corresponding conditional context, e.g. generation of a control signal for an actor AK is triggered (action on the real level) and/or data is updated (action on the virtual level), such as e.g. updating of counters, of stored data regarding item characteristics, stored predetermined sequences etc.

The characteristics of products (starting products, intermediate products, storage units and end products) or product groups (clusters of in succession conveyed, e.g. identical products, groups of products to be processed in parallel, storage units, shipping units etc.) present in the processing are advantageously registered on the real level at least in specific process areas, whereby it is not relevant whether this happens during a processing step, during conveyance into a processing step or away from it or during a passive phase (waiting loop, intermediate storage etc.) For this purpose corresponding sensors SE are to be provided. It is possible also to register actual item characteristics e.g. by data update (DA), which data representing encoded characteristics are stored in an electronic memory e.g. attached to the product or to the transport means. For reading and updating such data corresponding reading and writing means are to be provided. These reading and writing processes actually take place on the real level but they do belong to the virtual level, in the same way as when similar data correlated to a product or a group of products is stored in a central computer and updated there. Similar functions can be taken over by codes (e.g. line or color codes) being printed onto the products which are read with corresponding reading devices.

Characteristics of product groups encoded in the named manner can also contain characteristics of individual products contained in the group if these differ from each other. An example for this is a storage unit in form of a roll of addressed product parts with the characteristic that it e.g. contains the products c to y in a predetermined order from a know address sequence a, b, c, d, e . . . . From this kind of storage unit one product with a specific characteristic (e.g. address m) can be identified without real registration of the relevant characteristic (address) but by means of the corresponding sequence position i.e. by counting according to the distance from the first sequence position of the storage unit (address c) with first-in/first-out operation or by counting according to the distance from the last sequence position of the storage unit (address y) with first-in/last-out operation.

It is advantageous to proceed correspondingly for products on waiting loops or in other storage in which the product sequence is maintained or changes only little.

Figure 3:
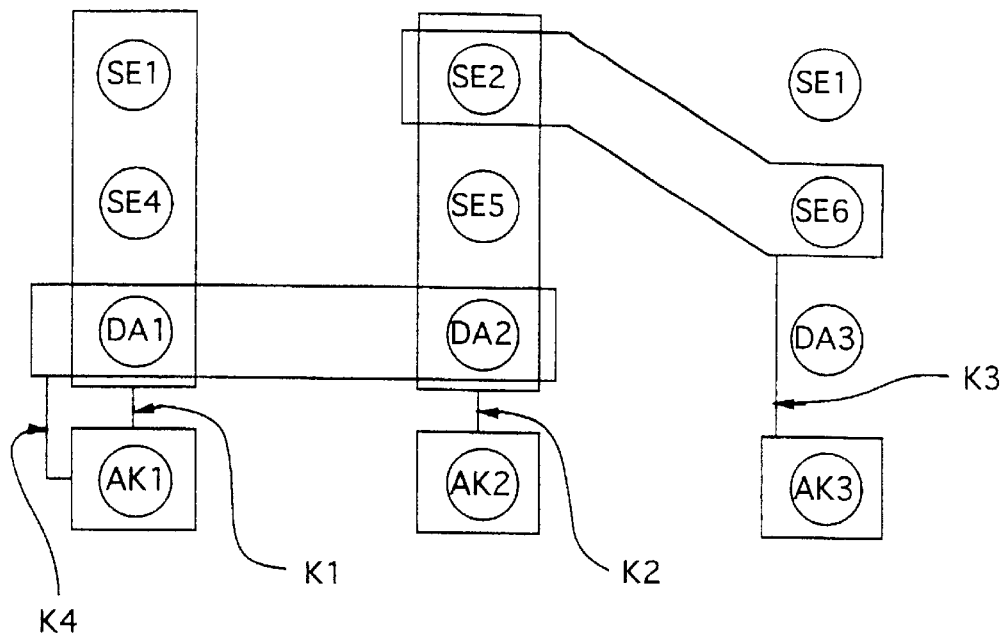
FIG. 3 shows a two-dimensional array of context associations.

FIG. 3 shows in a schematic two dimensional array, sensors SE1 to SE6, stored updatable data DA1 to DA3 and actors AK1 to AK3 which are provided e.g. for an installation for carrying out the inventive method. The sensors and reading of the stored updatable data serve for registering actual context elements. On the virtual level corresponding conditional context elements are to be defined. The actors serve for carrying out actions. Depending on the c onditions and/or depending on the process which is being carried out with the installation, different conditional context elements are linked with different actions to form control contexts K. In FIG. 3 the se are e.g. control contexts K1 (SE1/SE4/DA1 - AK1), K2 (SE2/SE6/DA2 - AK2), K3 (SE2/SE6 - AK3), K4 (DA1/DA2 - AK1) . . . ,or in general Kn (SEn to SEm/DAu to DAv - AKs to AKt).

As shown in FIG. 3, not only sensors and actors of a locally or functionally restricted process area are linked together but in particar sensors and actors which are distanced from each other upstream or downstream and stored data regarding distanced process areas.

Figure 15:
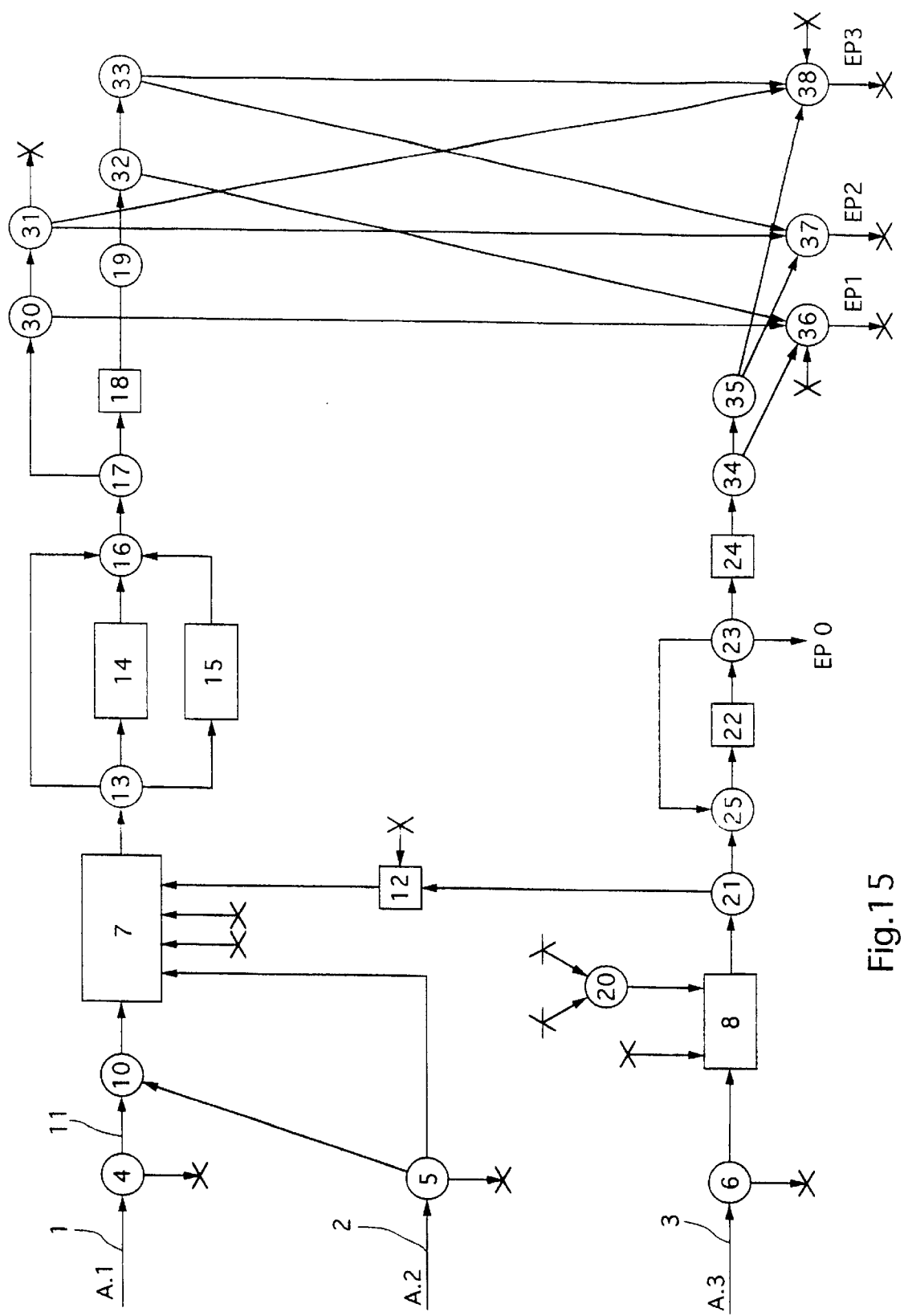
FIG. 15 shows a method diagram for an exemplified embodiment of the inventive processing method.

FIGS. 4 to 8 show exemplified variants of sequence transformations as used in the inventive method. All sequence transformations are shown as circles (sequence changing station) into which products p are fed on at least one path (arrow towards circle) and from which products are conveyed away on at least one path (arrow away from circle). Exemplified applications of sequence transformations according to FIGS. 4 to 8 are shown in FIG. 15.

Figure 4:
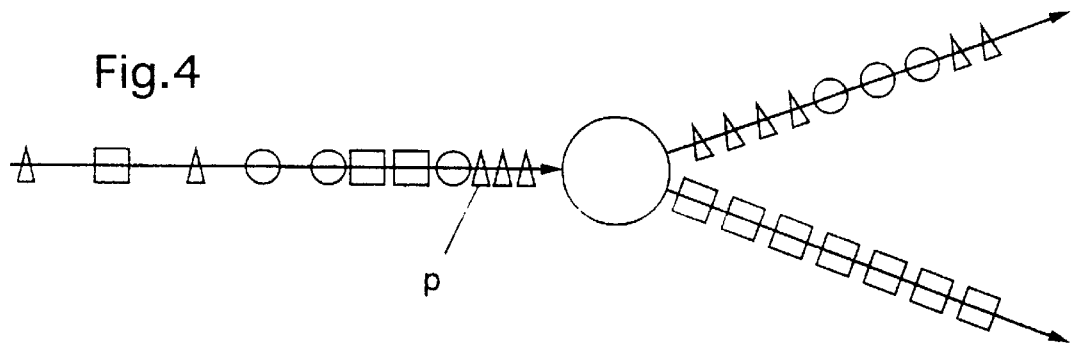
FIGS. 4 to 8 show different, exemplified embodiments of stations for sequence transformation.

FIG. 4 shows an extraction of products from a product stream to form two (or more than two) product streams. In the shown example, products differing from each other regarding at least one of their characteristics (schematically shown by circles, squares and triangles all representing individual products) are supplied and the sequence transformation is such controlled that the squares are extracted from the product stream to their own path (characteristic-controlled extraction). Furthermore, the sequence transformation is such that the products which are conveyed away are clocked (are conveyed with regular distances between them). This makes it necessary for the supplied products to be buffered e.g. before the sequence transformation (buffering on the supply side: shown by minimal distances between the products in the end region of the supply path). If gaps in the clocked streams are to be prevented the buffering must be arranged on the removal side (between extraction and clocking; not shown).

The sequence transfor mati on shown in FIG. 4 is a characteristic-controlled extraction with clocking and with buffering on the supply side and/or on the removal side, whereby buffering is to be understood as an ordered waiting with first-in/first-out operation.

An example of a variant of the sequence transformation shown in FIG. 4 is a characteristic-controlled extraction without clocking which is realizable without buffering and to which a clocked or irregular product stream can be supplied.

Figure 5:
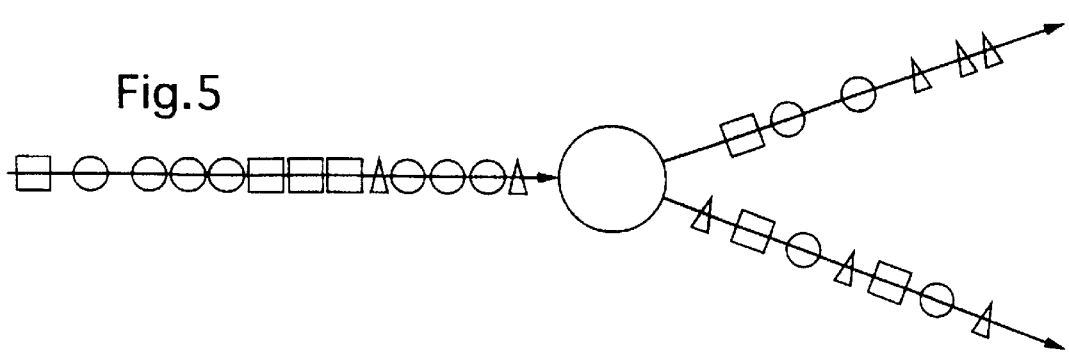

FIG. 5 shows a further example of a sequence transformation in form of a characteristic- and sequence-controlled extraction with buffering on the supply side. Products differing fr om each other are supplied and a predetermitined product sequence (shown here as a regular sequence) is formed by means of extraction (e.g. on to a waiting loop) according to product characteristics and according to an actual sequence position. The sequence thus formed is e.g. conveyed aw ay as a clocked stream.

Figure 6:
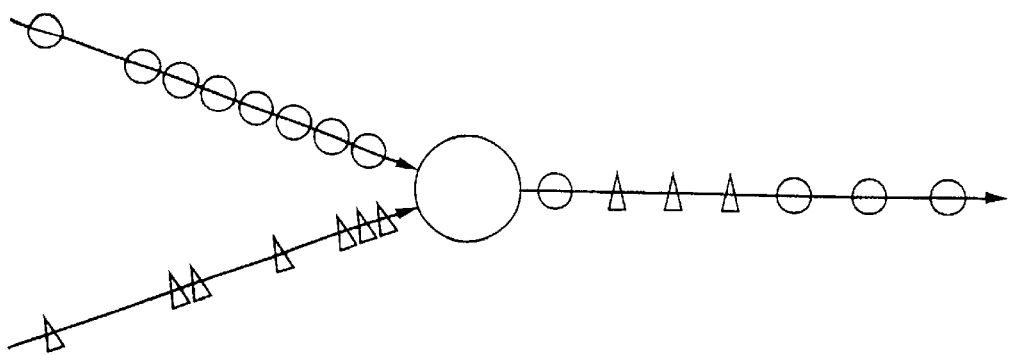

FIG. 6 shows a further example of a sequence transformation in form of a sequence-controlled introduction of products into a product stream with clocking and buffering on the supply side by which two kinds of products from two supply streams are conveyed away on one removal path in a clocked manner and in a predetermined sequence.

Figure 7:
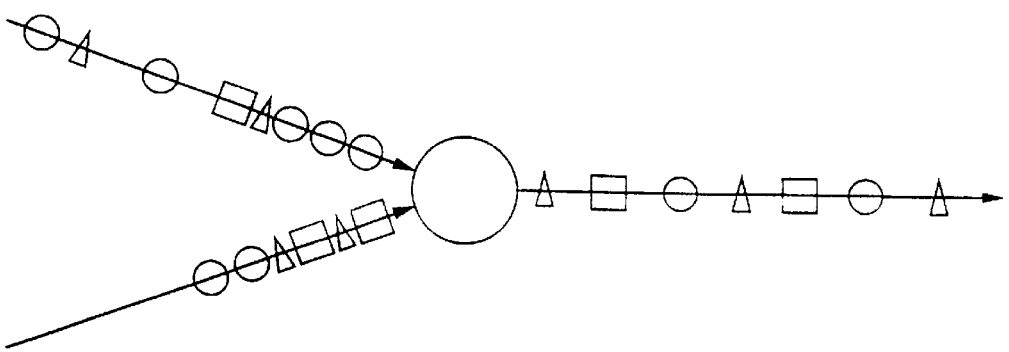

FIG. 7 shows a characteristic- and sequence-controlled introduction with clocking and with buffering on the supply side, whereby products are introduced into a product stream from a second product stream (e.g. waiting loop) in order to at least approximate a predetermined sequence in the first stream.

Figure 8:
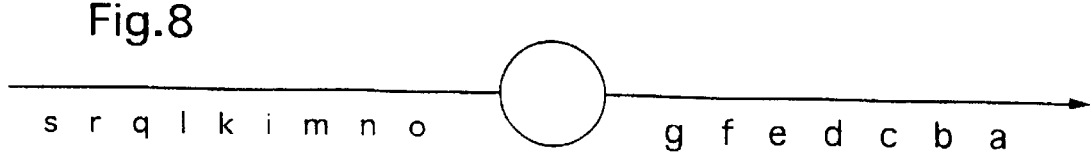

FIG. 8 shows a sequence transformation for changing the sequence in one only product stream. For this purpose it is necessary to provide waiting positions or overtaking paths respectively via which individual products can reach their required sequence position further upstream or further downstream respectively.

Figure 9:
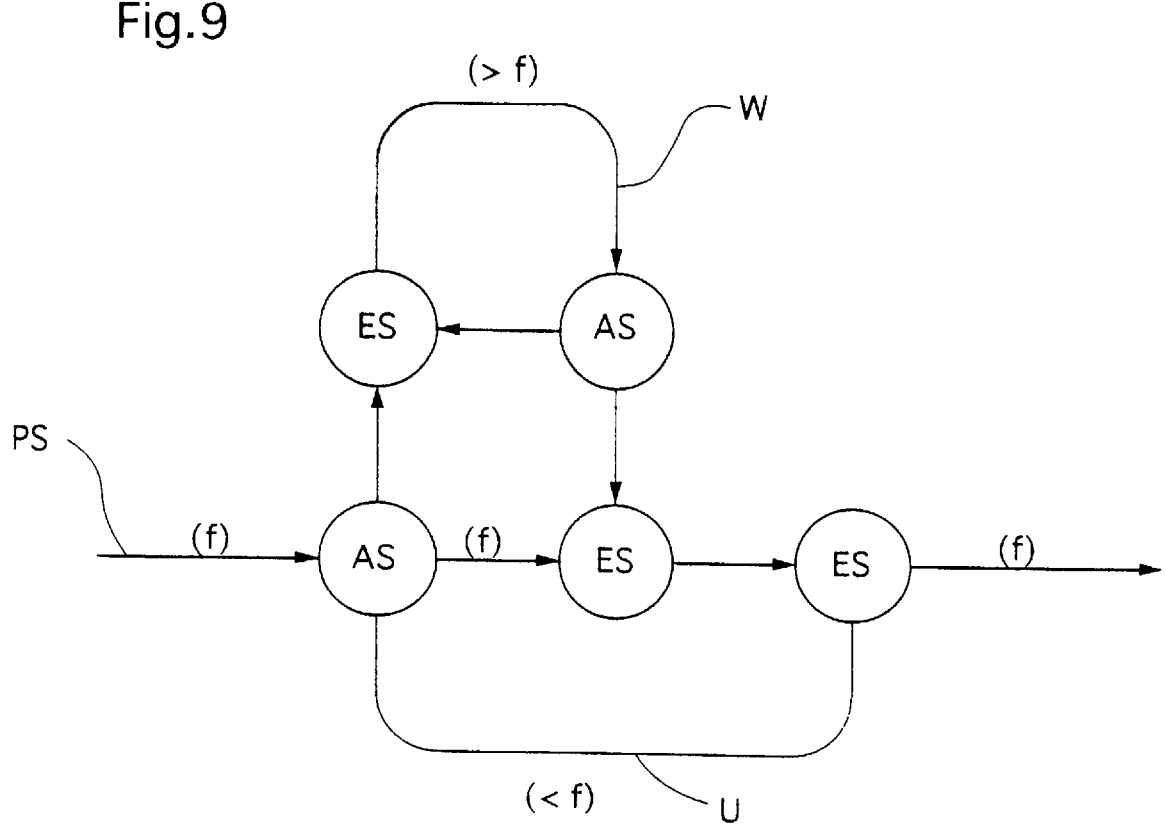
FIG. 9 shows the sequence transformation according to FIG. 8 as a combination of introductions and extractions.

A sequence transformation for changing the product sequence in one product stream can be represented as a process step as this is done in FIG. 8. Regarding devices such sequence transformation is e.g. realized as a combination of introductions ES and extractions AS (according to or comparable to the introductions and extractions according to FIGS. 4 to 7) which connect the path of the product stream PS with a waiting loop W and an overtaking path U, as is shown in FIG. 9. Thereby, all introductions and extractions are characteristic- or sequence-controlled, i.e. introduction and extraction take place only if the relevant characteristic of the actual product to be inserted or extracted is or is not the one corresponding to the characteristic defined by the actual sequence position.

The sequence transformation according to FIGS. 8 and 9 is e.g. used to form a predetermined sequence of addresses (a, b, c, d, . . .) from any or especially from a faulty address sequences (o, n, m, i, k, . . .).

It is obvious that by combining sequence transformations as shown in FIGS. 4 to 8 or by combining individual characteristics of the shown sequence transformations almost any sequence transformation can be realized.

Figure 10:
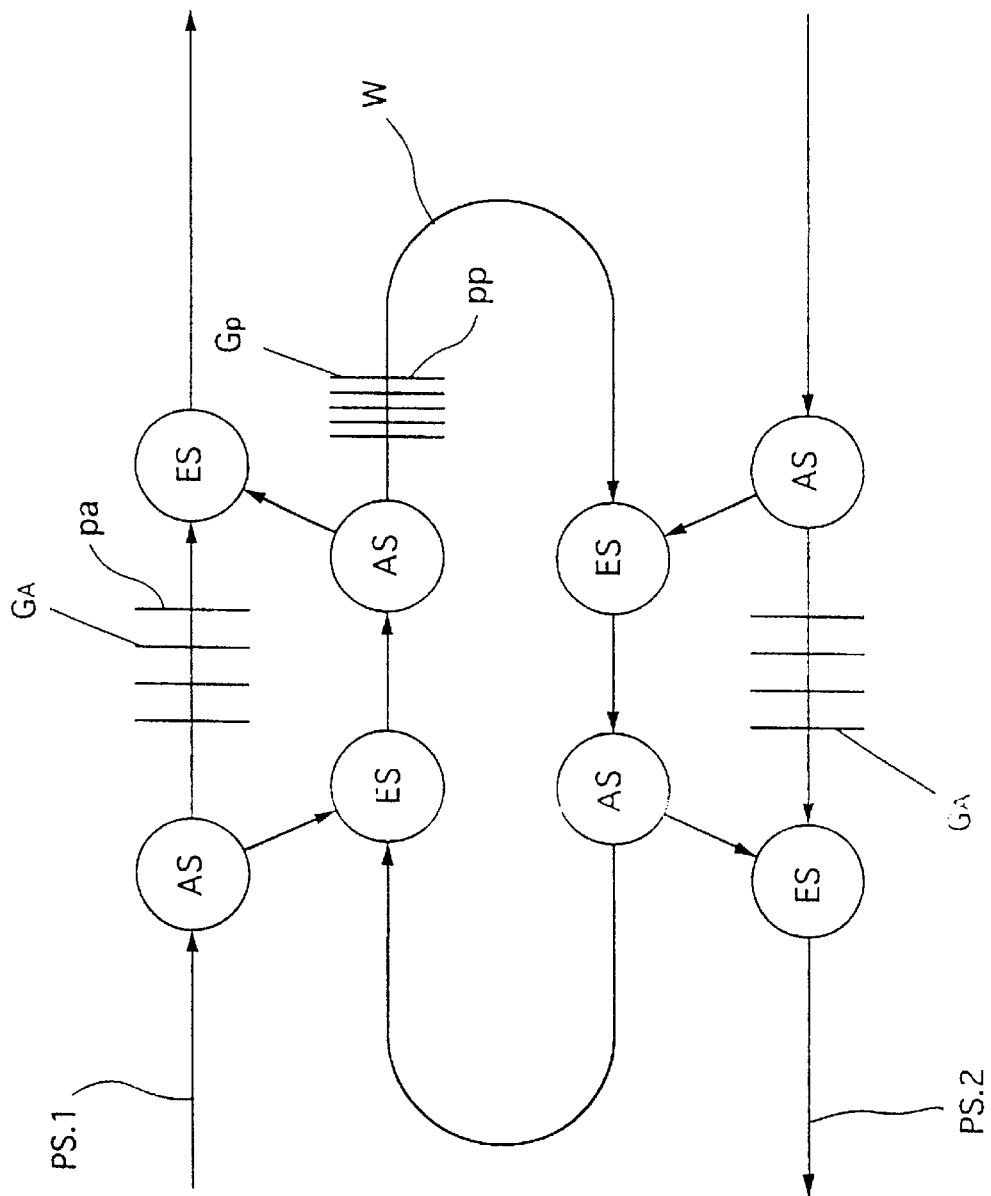
FIG. 10 shows a further example of a combination of introductions and extractions.

FIG. 10 shows a further example of a combination of different sequence transformations (introduction and extraction), which can e.g. serve the purpose of removing individual products or clusters of successive products from a product stream in a characteristic- and/or sequence-controlled manner and, after a waiting period, re-introducing them into a second or into the same product stream as required.

The sequence transformation according to FIG. 10 substantially consists of a waiting loop W which is arranged between the paths for two product streams PS.1 and PS.2, whereby the waiting loop comprises for each product stream an introduction location ES and an extraction location AS and whereby each path comprises one introduction location ES and one extraction location AS.

Operation of the device as illustrated in FIG. 10 is characteristic- and/or sequence-controlled. If the product streams PS.1 and PS.2 are to be clocked downstream of the waiting loop W, buffers must be provided at least in-between the extraction locations of the waiting loop and the introduction location into the streams PS.1 and PS.2.

Figure 11:
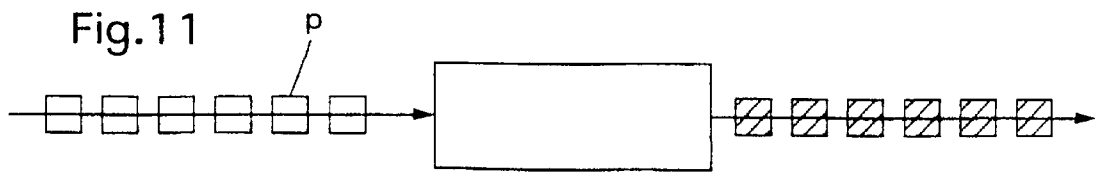
Figure 12:
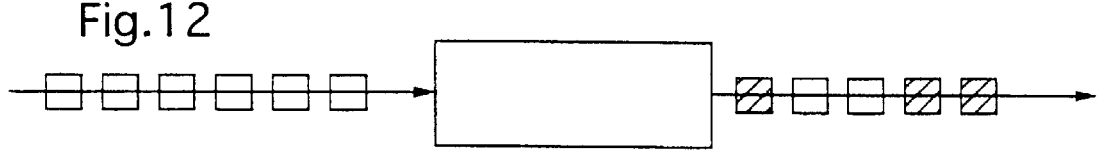
Figure 13:

FIGS. 11 to 13 show exemplified processing steps as applicable processing according to the inventive method. The processing steps are shown as processing stations (rectangles) to which products are supplied on at least one supply path (arrow directed towards the rectangle) and from which products are conveyed away on at least one removal path (arrow directed away from the rectangle). The products again are shown as circles, squares and triangles, whereby processed products which differ from not processed products in at least one characteristic are shown in hatched manner.

FIG. 11 shows a purely clock-controlled processing step to which a clocked product stream is supplied and each product is processed in the same manner. The products supplied to the processing step are shown to be identical which, however, is not a condition. They can easily differ in one characteristic which is not relevant to the processing step in question (e.g. stitching of newspapers which are already individually addressed or magazines of identical form with different contents). The products may be buffered on the supply side and may be clocked-in for processing.

The same processing step can also be object-controlled instead of clockcontrolled, such that it is activated only when an item to be processed is present on the supply side. Thus, it becomes possible to supply the products to the processing step in an irregular stream.

FIG. 12 shows a sequence- and clock-controlled processing step in which e.g. a predetermined sequence of processed and not processed products is established by controlled repression of processing in predetermined time intervals. The products of the sequence to be established can also be selectably processed in different processing modes. This kind of processing step can also be object-controlled.

FIG. 13 shows a further, exemplified processing step which is characteristicand clock-controlled. Products shown as triangles are not processed (or according to mode I) and products shown as circles or squares are processed (or processed according to mode II). The products in the shown embodiment of the processing station are buffered on the supply side and are clocked-in for processing.

Figure 14A:
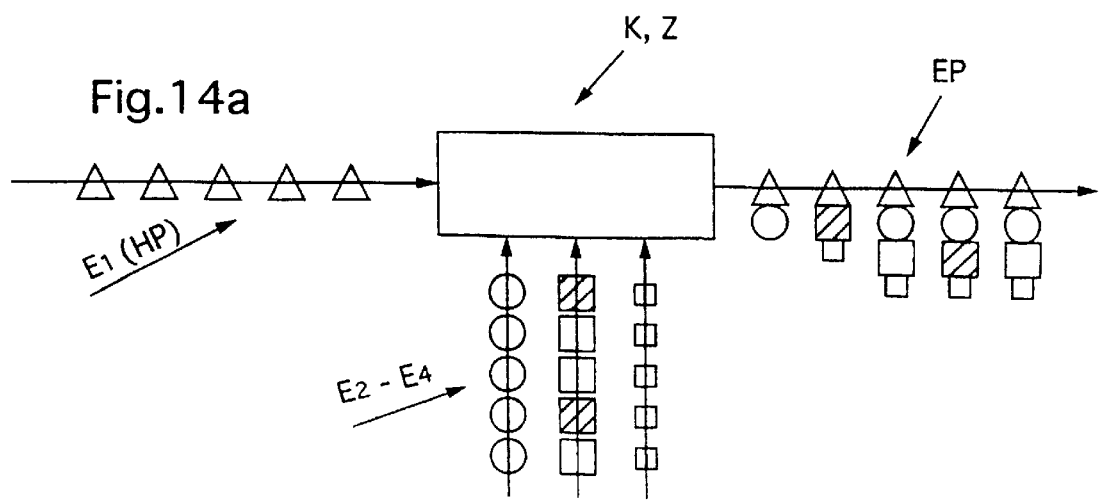

FIG. 14a finally shows a processing step in which on e.g. four paths product parts are supplied to be processed into products by means of gathering (allocation direction e.g. inserting, collecting, collating). Hereby, main products E1(HP) are e.g. supplied on a path in a clocked manner and supplements E.2 to E.4 are added in a characteristic- and/or sequence-controlled manner such that the products EP conveyed away from the processing step may differ from each other regarding the main product and/or regarding the supplements. Depending on the character of the supply streams (clocked or irregular) the processing step is clock- or object-controlled.

Figure 14B:
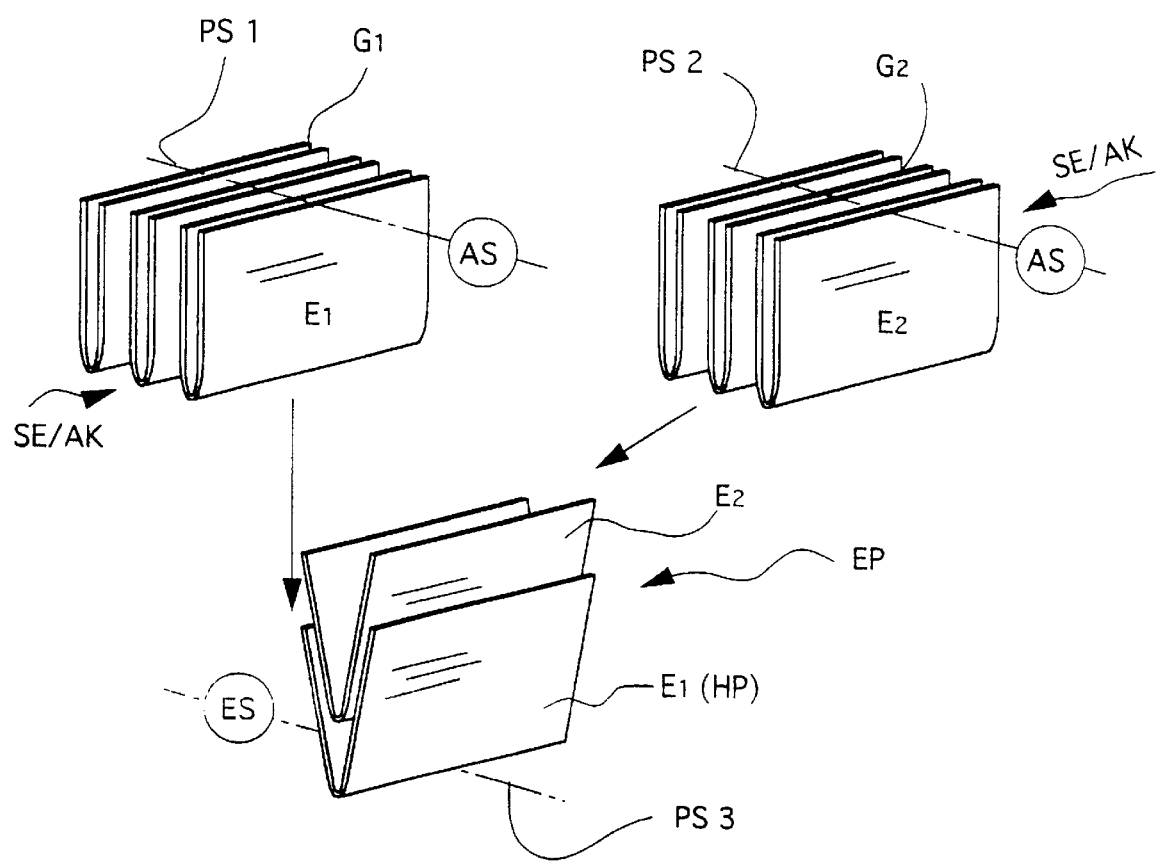

FIG. 14b shows a simple variant of a processing step identical to the one shown in FIG. 14 but as a three-dimensional representation of the actually involved products (E1 and E2). A group G1 of e.g. identical main products E1(HP) is conveyed in a product stream PS1 towards an extraction location AS. A group G2 of e.g. identical insert products E2 is conveyed in a second product stream PS2 towards an extraction location AS. If products with inserts (E2 inserted in E1) are to be produced and products E1 and E2 are simultaneously present in the extraction locations of the product streams PS1 and PS2 (can e.g. be verified by means of sensors SE) products E1 and E2 are extracted from the streams by corresponding actors AK, products E1 are opened and products E2 are inserted and the new product EP is introduced (ES) into a further product stream PS3. Other products E1 or E2 respectively wait for a corresponding product E2 or E1 respectively if this is required.

In the same way as sequence transformations, processing steps as described above and/or individual features thereof can be combined in a freely selectable manner whereby such combinations result in further embodiments.

The terms characteristic-controlled, sequence-controlled, clock-controlled, object-controlled denominate control modes of sequence transformations and of processing steps. In certain cases it may be advantageous if sequence transformations and/or processing steps can be switched from one control mode to another one.

FIG. 15 shows a diagram of an exemplified embodiment of the inventive method comprising a plurality of processing steps and a plurality of sequence transformations, whereby product streams are supplied to the processing steps and sequence transformations and are conveyed away from them. The diagram can also be interpreted as a diagram of an exemplified installation for carrying out the method, i.e. a system of processing stations linked by transport paths and sequence transformation stations. The example is again taken from the field of further processing of printed products which, however, does not mean that the inventive method is exclusively applicable in this field.

In the diagram of FIG. 15 symbols with reference to FIGS. 4 to 14 are used with the following meanings:

rectangle: processing step or processing station respectively;

circle: sequence transformation or sequence transformation station respectively;

unbroken line with direction arrow: product stream or path for product transport respectively;

cross with arrow directed away from it: transformation of e.g. discrete storage units into a product stream or e.g. unwinding station, sheet feeder etc.

cross with arrow directed towards it: transformation of a product stream into e.g. discrete storage units or shipping units or e.g. winding station, packaging station etc.

The stream of items in the method as shown in FIG. 15 moves substantially from left to right. On the left there are three paths 1, 2, 3 for streams PS of starting products A.1, A.2 and A.3, whereby these starting products are e.g. product parts of printed products (E1 . . .) being supplied to the inventive method from printing machines (not shown).

The three paths 1, 2, 3 lead into first sequence transformation stations 4, 5, 6 (sequence- or characteristic-controlled extraction) in which the starting products are released into the process according to a predetermined sequence or according to characteristics for being transported further into processing stations 7 or 8 respectively, into stations in which they are transformed into storage formation for intermediate storage or into further sequence transformation stations 10 (sequence- or characteristic-controlled introduction, advantageously with clocking into a further product stream 11).

The two processing stations 7 and 8 are stations in which several product parts are combined to form one product (e.g. inserting systems, collecting systems, collating line or something similar) as mentioned also in connection with FIG. 14. Product parts are supplied to this kind of processing station in several streams, whereby these product part streams are e.g. formed from storage units, proceed through a first processing station 12 (e.g. gluing on of an additional product which is fed from storage formations, e.g. packages) or from a sequence transformation station (5, 10, 6).

The product supply to processing stations 7 or 8 respectively can be characteristic- and/or sequence-controlled in a manner that the product streams leaving the stations comprise products of the most various compositions.

From the processing station 7 the products are transported via a further sequence transformation station 13 (e.g. characteristic-controlled extraction) selectably (e.g. depending on their thickness which varies with composition) into a further processing station 14 or 15 (e.g. for stitching or binding) or through a bypass. Processing stations 14 or 15 are followed by a further sequence transformation station 16 (e.g. sequence-controlled introduction with buffering on the supply side, with clocking and possibly with a waiting loop) in which the further processed products from processing station 7 are again combined to form a clocked stream. From this stream, products are extracted (characteristic-controlled extraction in sequence transformation station 17), whereby part of the products are supplied to an exit distribution as end products and the other part is supplied to further processing (e.g. characteristic-controlled addressing, processing station 18) and a sequence change (sequence transformation station 19 for forming a predetermined address sequence). From here, the products are also supplied to an exit distribution.

In the processing station 8, product parts are gathered to form intermediate products, the product parts being supplied from sequence transformation station 6, from storage units and/or in a supply stream into which products from two different storage formations are supplied in a sequence-controlled introduction (sequence transformation station 20). This processing station 8 is e.g. purely clock-controlled, i.e. it delivers products at regular intervals all containing an identical number of product parts but depending on sequences of the product parts being supplied.

The products leaving the processing station 8 are divided onto two paths in a sequence transformation station 21 (e.g. sequence- and/or characteristic-controlled extraction), whereby one is a supply path to the processing station 7 via the processing station 12 and the other leads into a further processing station 22 (e.g. stitching and equipping with spine strip). The processing station 22 is combined with a checking loop which e.g. has the following function: the products delivered from the processing station are supplied to a further processing station 24 (e.g. sequence-controlled addressing) if they are found to be in order, if they are found faulty they are removed from the method as waste (end product EP.0) in a characteristic-controlled extraction (sequence transformation station 23) or if the spine strip is missing they are resupplied (sequence transformation station 25) to the processing station 22. The products conveyed away from the processing station 24 are supplied to an exit distribution.

The exit distribution consists of further sequence transformation stations 30 to 38, whereby sequence transformation stations 30 and 31 are e.g. sequence-controlled extractions (controlled according to the demand of the following stations), sequence transformation stations 32 to 35 are e.g. characteristic- and sequence-controlled extractions (e.g. controlled according to a predetermined post code sequence) possibly with buffering on the supply side and sequence transformation stations 36 to 38 are e.g. characteristic- and sequence-controlled introductions (again controlled according to a post code sequence) with buffering on the supply side and clocking-in. Between the successive pairs of sequence transformation stations (34/36, 35/37, 35/38 etc) additional sequence transformation stations for sequence changes (sequence corrections) may be provided if required.

A product exit from the sequence transformation station 31 to a transformation into storage units is also shown. This can be an intermediate storage for not addressed products which are not required at the moment, which are later supplied to sequence transformation stations 36 and 38 or to other process areas as marked in the Figure.

It is obvious that the method according to FIG. 15 can be extended by a path for a product stream which directly links a further entrance for starting products or one of the sequence transformation stations 4, 5 or 6 with one of the sequence transformation stations 30 to 38.

The streams of end products EP.1 to EP.3 e.g. have a product sequence corresponding at least to packages to be made and are e.g. directly made to packages (discrete shipping units). For further establishing a package sequence corresponding to a post route, further sequence transformation stations are to be connected to exits EP.1 to EP.3 if this is required. However, such stations being concerned with packages, i.e. with a different type of piece good than the method described above in connection with FIG. 15, they would therefore have to be treated as a following, further processing method.

It can be seen from FIG. 15 that with the help of the inventive method or a corresponding installation respectively the most various processes, which use different links between processing steps can be carried out, depending on the kind of starting products and on the type of end products to be produced. Different processes of this kind which actually have no mutual connection can be carried out simultaneously in order to keep the operating rate and therefore the output in items per time unit as high as possible. By controlling such a process in a context orientated manner and by using control contexts containing context elements not allocated to one single locally and/or functionally limited process area it can be ensured that a product required for a processing step is kept available at the right time in the right location.

FIG. 15 merely shows, as mentioned previously, an example for the inventive method and by no means limits this to the fields of products of printing machines or to the specific design shown in FIG. 15.

As mentioned initially, new paths must be found also for controlling the inventive method in order to meet the demands of the complexity and flexibility made possible by the method. Control of known processing methods for piece-goods need to identify individual products being processed if at all as locations within a substantially sequence-invariant stream (e.g. as faulty product, which is to be extracted from the stream on the next occasion, or as a gap which is to be treated equally to a product with zero-characteristics and which is not to be processed in the next processing station). Therefore, such control mostly deals with characteristics of these products very locally (e.g. in checking steps). Over wide stretches of the known methods, however, processing steps and also transport movements are purely clock-controlled either coupled to each other or more or less independent of each other or they are possibly object-controlled (actions regularly triggered by clock or irregularly by the presence of an item).

For carrying out the inventive method, it is necessary that the method control also shows a substantially increased flexibility which can be maintained to a very high method complexity.

In addition to the clock regime which is the main characteristic of known controls for piece-good processing or instead of it, a context-orientated control (context in the sense of situational relationship) is used, in which an action is not triggered at a predetermined time as in the clock-regime but when a certain situation or context is established, i.e., e.g. when an item having specific characteristics has been transported to a specific location or when a device has been configured for a specific processing, i.e. when an actual context coincides with a predetermined or conditional context.

Context orientated controlling thus substantially bases on a large number of control contexts each containing at least one conditional context or group of connected conditional contexts and at least one action or action group to be triggered, whereby each action or action group is linked to a conditional context or to a context group to form a pair. If a control context contains several pairs of conditional context and action these can be ordered according to priorities or in a sequence to be handled in succession (for sequence-controlled actions). The control contexts develop their controlling effect such that when actual and conditional contexts coincide, then the action linked to this context is triggered (i.e. coincidence of actual and conditional context becomes the criterion for triggering the action linked to the context). By such triggering one or several new, actual contexts are created which are compared with further conditional contexts for triggering further actions.

The total of all control contexts represents the complete processing method with all its possibilities. The production of the starting products to be supplied to the processing method, the management of the storage units formed from the product streams for intermediate storage, their re-supply into the processing method by transforming them back into a product stream as well as the monitoring of supplied starting products and of end products can be integrated into the context orientated method for controlling the inventive method without problems.

The starting products to be processed are supplied to the process, as demanded by the process, individually or in clusters of successive products and they are processed in successive processing steps. They are removed from active processing between process steps, made passive (individually on waiting loops or as small clusters for shorter waiting times, as larger clusters in storage formations for intermediate storage) and then they are activated again, i.e. introduced into product streams or transformed to such streams. This all happens under the regime of a mutual context-orientated process control which orientates itself according to a plurality of predetermined control contexts being organized in context fields according to the processes.

A control context for a characteristic-controlled processing step thus e.g. consists of alternative pairs {characteristic→action}; for the processing step according to FIG. 13 this means for clock-controlled operation: {circular or square→process; triangular→repress processing} and for object-controlled operation {item present and circular or square→process}. For a sequence-and object-controlled processing station (e.g. according to FIG. 12) an exemplified control context for each actual position in the predetermined sequence to be established is: {item present and actual sequence position=z→process according to the sequence position (z) and raise position in the sequence to by one}, whereby during a processing course not yet processed sequence-position/action pairs can be updated according to the most various requirements downstream (e.g. faults which make an increased production of a certain product necessary).

An exemplified control context for a sequence transformation station according to FIG. 8 and 9 for sequence position f is: {characteristic=f→convey further on path; characteristic>f→convey onto waiting loop; characteristic<f→convey on overtaking path}.

For actions which effect a synchronization of e.g. two parallel, clocked product streams or something similar the conditional contexts also contain temporal conditions.

For controlling a process according to the inventive method, process paths are to be defined proceeding through a succession of a large number of contexts organized in context fields.

Figure 16:
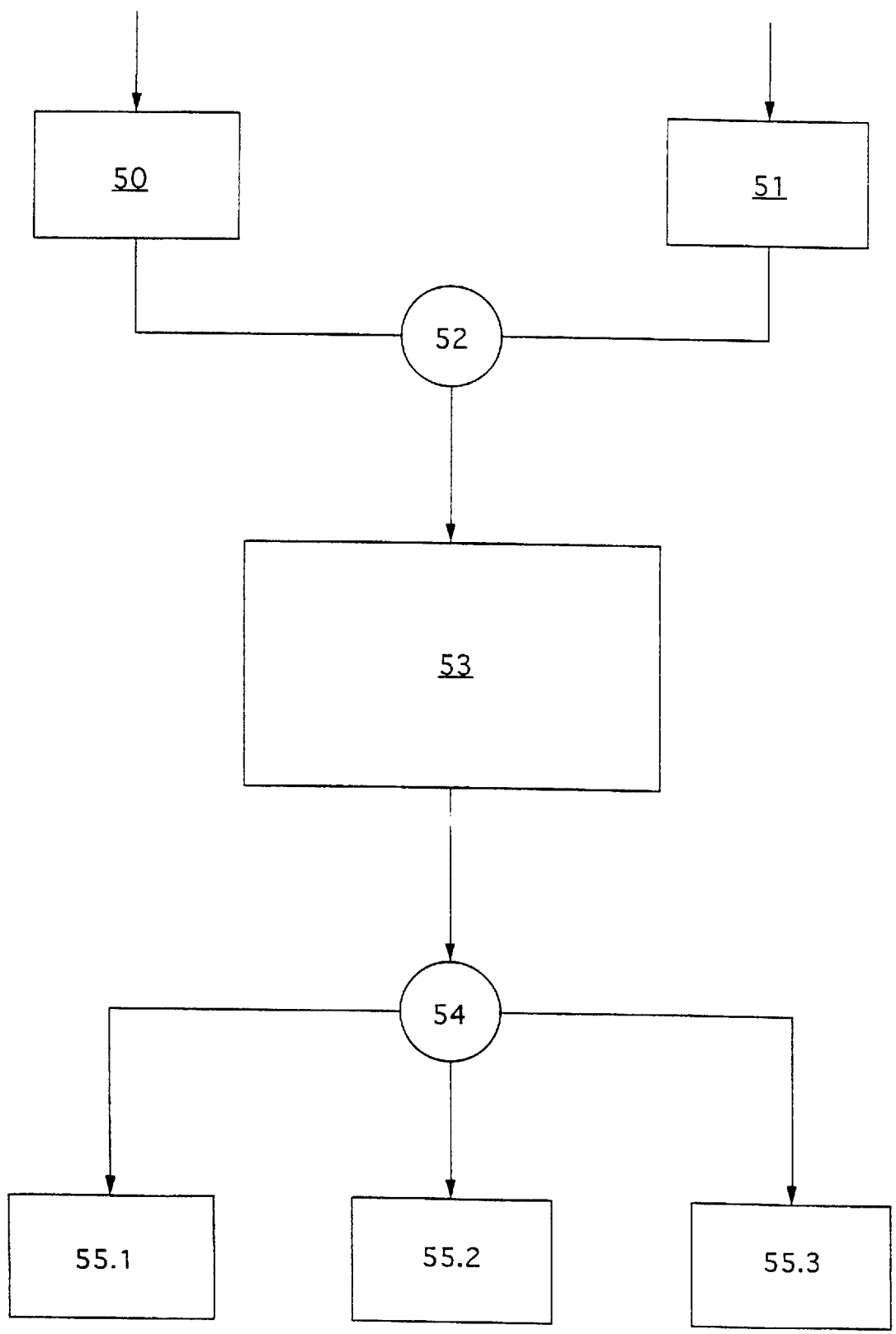
FIG. 16 shows a diagram for illustrating the structure of a context-orientated controlling method.

FIG. 16 diagrammatically shows how to proceed when defining such context fields.

Before initializing on the real level a process being controlled according to the inventive method a kind of inventory is made in form of data sets. These on the one hand comprise possible, conditional contexts (e.g. products or product groups appearing during the process and to be identified by relevant characteristics or positions in established sequences or sequences to be established, conditions of devices, sequences to be established, temporal conditions etc.) and on the other hand they comprise necessary and possible actions (processing according to a specific mode, raising the sequence position in a specific sequence by one, updating of a specific sequence, updating of stored data, e.g. encoded product characteristics etc.).

The named examples show that actions can relate to the real level (switching-on—devices, setting switch points etc.) but can also relate to the virtual level (updating sequences to be established or updating data etc.).

The data sets for conditional contexts and actions are stored in libraries 50 for conditional contexts and 51 for actions and then are combined to form pairs and control contexts for processes to be carried out (52). The control contexts are stored in a context library 53. Creating a context library 53 means registering a very large amount of data, but within the processing only changes have to be taken into consideration which in comparison is little data and can be carried out fast and flexibly. This is the reason for the fact that on raising the method complexity costs do not rise over-proportionally and the desired flexibility can be maintained.

A context library is a database in which data sets, which describe control contexts (K), are held ready for processing. This kind of library can be extended in a substantially unlimited manner. Incomplete control contexts (e.g. fault contexts for not foreseeable faults) can also be stored in this kind of library which contexts are then completed during processing in a kind of learning process. Apart from the control contexts necessary for carrying out the process, control contexts for foreseeable faults, which only possibly occur, must also be stored.

It is also possible to continuously register new control contexts (K) in the context library 53 during the course of the process in self-learning procedures. These new contexts can be used for gradual refining of the control contexts, for optimizing the process, for optimizing the linking of several processes proceeding at least partly simultaneously or for process changes. The control contexts stored in the context library form a kind of macros which are combined (54) for each specific process (specific starting products (A) and specific end products (EP)) in a context field 55.1 to 55.3 which context field is then proceeded through on process paths leading from control context to control context.

This progress through context fields is a virtual image of the manner how real product streams progress through the processing method and get processed, whereby control signals generated according to control contexts and controlling real devices as well as sensor signals representing characteristics of products or conditions of devices can be looked at as connections between the virtual level and the real level (also see description of FIG. 17). Two relatively simple examples of context fields are shown in FIGS. 1 and 2.

The effect of a context-orientated controlling method on a processing method for piece-goods is shown schematically in FIG. 17 in form of a very simple example of an interaction between a virtual and a real level.

The shown, very simple process comprises a gathering step (collating, processing step B1) on the real level R (lover part of the Figure) in which main products HP and supplements BA or BB are gathered. The supplements BA and BB are supplied from storage units which are transformed into product streams and are supplied to a sequence transformation S.1 in which supplements BA or BB are introduced into a supplement stream BA/BB in a sequence-controlled manner.

The transformation of the storage formations into product streams is only activated when the relevant characteristic of the supplements has been verified (sensors 56 and 57).

After a processing step B.1, the gathered products are bound (processing B.2) and are then supplied to a second sequence transformation S.2 in which inadequately bound products are extracted in a characteristic-controlled manner. A sensor 58 registers the real characteristic of the quality of the binding. Adequately bound products are fed into an addressing station (B.3) where they are addressed according to a predetermined address sequence updated according to actions of S.2 (updating of the address sequence: broken arrow from K5 to K6). Then the products are supplied to a third sequence transformation S.3 in which the predetermined address sequence is established by adjusting the real sequence in a characteristic-controlled manner (registration of address by sensor 59 or from the updated address sequence for B.3).

The context field to be progressed through in a process as described above is shown on a virtual level V (upper part of the Figure). It comprises the following contexts:

K1: {present storage unit contains BA→transform storage unit into product stream; storage unit does not contain BA exchange storage unit} (registration of the actual context via sensor 56);

K2: {present storage unit contains BB→transform storage unit into product stream; storage unit does not contain BB→exchange storage unit} (registration of the actual context via sensor 57);

K3: {BA present and sequence position requires addition of BA→BA to be introduced and sequence position to be raised by 1; BB present and sequence position requires addition of BB→BB to be introduced and sequence position to be raised by 1} (registration of the actual context on virtual level: by registration of the positions of storage units of BA and BB);

K4: {HP and BA or BB present→gathering and conveying further and binding} (registration of the actual context on virtual level. Supplement sequence established in S.1);

K5: {binding o.k.→convey further; binding not o.k.→extract and update address sequence for K6} (registration of the actual context by means of sensor 58);

K6: {product present, sequence position z→addressing according to sequence position z, raise address sequence position by 1} (registration of the actual context on virtual level: position in updated address sequence);

K7: {address according to actual position in predetermined address sequence→convey further on path; address according to later position in predetermined address sequence→convey onto waiting loop; address according to earlier position in predetermined address sequence→convey onto overtaking path} (registration of the actual context virtual: updated address sequence; or real by means of sensor 59).

In FIG. 17 the interaction between real level and virtual level is shown by means of a line. This interaction as mentioned before comprises in particular control signals transmitted from the virtual level to the real level and sensor signals transmitted from the real level to the virtual level.

For carrying out the inventive method an installation is created, of which in FIG. 17 an exemplified embodiment is shown. This installation comprises at least one processing station, in particular a plurality of processing stations and at least one sequence transformation station, whereby a plurality of transport paths leading to the processing and sequence transformation stations and away from these is provided. Furthermore, the installation comprises drives and guide means with which the individual products or product groups are conveyed along the transport paths. In order to avoid, in particular in the sequence transformation stations, a plurality of transfers of products from transport or guide means to further transport or guide means, advantageously utually independent transport means are used which are advantageously designed as guide means also such that the products can be transported having a defined position which is possibly changeable with corresponding control means. As drive means for conveying the transport means along the transport paths e.g. stationary drives are provided which cooperate with the transport means along a determined length of a transport path. These or similar drives are also used for clocking the transport means.

For identification of the products conveyed individually or in groups by the transport means these may be equipped with electronic memory means which are overwritten for updating of the stored data and/or are read for registration of actual contexts by corresponding reading and/or writing devices.

What is claimed is:

1. A method for processing piece-goods through one or more sequential processing steps, each step converting products in a product stream from a first state to a second state, wherein for individual products in the product stream said first state is different from the second state in the quality of the product, the order of products in a sequence within the product stream, or both, said method comprising the steps of:

supplying products in their first state in a stream from a first area to a first processing station;

processing or not processing the products in the stream to their second states as determined by a control context; and conveying products from the first processing station to a second area, wherein the control context defines a set of control conditions which if met by the actual conditions will result in activation of a selected processing of the products in the first processing station, and wherein said control context comprises one or more characteristics selected from among the following:

(a) more than one condition must be satisfied for the control context to be met and the selected processing to be activated;

(b) actual conditions in more that one of the first area, the second area and the first processing station must be satisfied for the control context to be met and the selected process to be activated; and (c) satisfaction of control conditions of a control context results in an action in which the control conditions in the same or a different control context are updated or changed.

2. The method of claim 1, wherein the method includes at least one processing step which is controlled according to characteristics of the products supplied in the product stream.

3. The method of claim 1, wherein the method includes at least one processing step wherein a sequence transformation on the products is performed in accordance with a sequence established based on input from a downstream sensor.

4. The method of claim 1, wherein products in the product stream are supplied to or conveyed away from the first processing station in a clocked stream.

5. The method of claim 1, wherein products in the product stream are supplied to or conveyed away from the first processing station in an irregular stream.

6. The method of claim 1, wherein the processing step in the first processing station is controlled by a control context that includes a clock-regime or by the presence of an item to be released or processed in the first processing station.

7. The method of claim 1, wherein the processing step performed in the first processing station is a sequence transformation.

8. The method of claim 7, wherein the processing step in the first processing station is controlled by a control context that includes a clock-regime or by the presence of an item to be released or processed in the first processing station.

9. The method of claim 1, wherein the first processing station comprises a waiting loop or an overtaking path, or both, and products from the product stream are inserted into or extracted from the waiting loop or overtaking path.

10. The method of claim 1, wherein the product stream is buffered before being supplied to the first processing station.

11. The method of claim 1, wherein relevant characteristics of the products for determination of the actual context are registered by sensors, by reading encoded information from electronic memory means carried by the products, or by updating corresponding, centrally-stored data nets.

12. The method of claim 1, wherein products in a plurality of product streams are supplied to the first processing station.

13. The method of claim 1, wherein at least a portion of the products supplied to the first processing station are produced by transforming discrete storage units.

14. The method of claim 1, wherein at least a portion of the products conveyed from the first processing station are transformed into discrete storage units.

15. The method of claim 1, wherein each of the products in the product stream are conveyed with the help of individual transport means which are independent of each other.

16. The method of claim 1, wherein the products are at least partly products of printing machines.

17. The method of claim 1, wherein the characteristics of the control context include the characteristic that more than one condition must be satisfied for the control context to be met and the selected processing to be activated.

18. The method of claim 1, wherein the characteristics of the control context include the characteristic that actual conditions in more that one of the first area, the second area and the first processing station must be satisfied for the control context to be met and the selected process to be activated.

19. The method of claim 1, wherein the characteristics of the control context include the characteristic that satisfaction of control conditions of a control context results in an action in which the control conditions in the same or a different control context are updated or changed.

20. A method for controlling processing of piece-goods through one or more sequential processing steps, each step converting products in a product stream from a first state to a second state, wherein for individual products in the product stream said first state is different from the second state in the quality of the product, the order of products in a sequence within the product stream, or both, and wherein products are supplied in their first state in a stream from a first area to a first processing station; processed or not processed in the stream to their second states as determined by a control context; and conveyed from the first processing station to a second area, said method for controlling comprising the steps of:
   making observations of the product stream in one or more of the first area, the second area, and the first processing station;
   comparing the observations to a stored value of the control context for the first processing station; and
   sending a signal to activate processing in the first processing station when the comparison of step shows that the control context is met, wherein the control context defines a set of control conditions which if met by the actual conditions will result in activation of a selected processing of the products in the first processing station, and wherein said control contexts comprise one or more characteristics selected from among the following:
   (a) more than one condition must be satisfied for the control context to be met and the selected processing to be activated;
   (b) actual conditions in more that one of the first area, the second area and the first processing station must be satisfied for the control context to be met and the selected process to be activated; and
   (c) satisfaction of control conditions of a control context results in an action in which the control conditions in the same or a different control context are updated or changed.

21. The method of claim 20, wherein conditional contexts and processing options are stored in data sets, and wherein a plurality of control contexts are defined as combinations of the conditional contexts and processing options and stored in a context library.

22. The method of claim 20, wherein the control conditions and actual conditions include one or more conditions selected from the group consisting of characteristics of the products, sequence positions and temporal conditions.

23. The method according to claim 20, wherein at least one condition reflected by sensor signals, counter readings, clock times or updated data sets is registered as an actual condition.

24. An installation for processing piece-goods through one or more sequential processing steps, each step converting products in a product stream from a first state to a second state, wherein for individual products in the product stream said first state is different from the second state in the quality of the product, the order of products in a sequence within the product stream, or both, said apparatus comprising:
   at least a first processing station,
   a first conveying path for supplying products in their first state in a stream from a first area to the first processing station;
   a second conveying path for conveying products from the first processing station to a second area;
   means for registering of actual conditions at various points in the apparatus; and
   control means for at least partially controlling the transport and processing of products by means of a control context, wherein the control context defines a set of control conditions which if met by the actual conditions will result in activation of a selected processing of the products in the first processing station, and wherein said control context comprises one or more characteristics selected from among the following:
   (a) more than one condition must be satisfied for the control context to be met and the selected processing to be activated;
   (b) actual conditions in more that one of the first area, the second area and the first processing station must be satisfied for the control context to be met and the selected process to be activated; and
   (c) satisfaction of control conditions of a control context results in an action in which the control conditions in the same or a different control context are updated or changed.

25. The installation of claim 24, wherein the first conveying path, the second conveying path, or both comprise individual transport means for transporting individual products.

26. The installation of claim 24, wherein the control means comprises a central computer of a network of computers.

27. The installation of claim 26, wherein the computer or computers are functionally coupled with stored databases of conditional contexts, of possible actions and of control contexts.

28. The installation of claim 24, wherein the means for registering actual conditions comprises electronic counters for registering sequence positions.

29. The installation of claim 24, wherein the means for registering actual conditions comprises internal clock generators for timing.

30. The installation of claim 24, wherein the means for registering actual conditions comprises one or more sensors.

31. The installation of claim 24, wherein the products or a conveying path carrying the products carry electronic indicators encoding characteristics of the product characteristics, and wherein the installation further comprises means for reading and updating the electronic indicator.

* * * * *